(12) United States Patent
James

(10) Patent No.: US 10,072,609 B2
(45) Date of Patent: Sep. 11, 2018

(54) SYSTEM, APPARATUS, AND METHOD FOR THRUST VECTORING

(71) Applicant: ROHR, INC., Chula Vista, CA (US)

(72) Inventor: Norman J. James, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 437 days.

(21) Appl. No.: 14/855,083

(22) Filed: Sep. 15, 2015

(65) Prior Publication Data

US 2016/0003189 A1  Jan. 7, 2016

Related U.S. Application Data

(63) Continuation of application No. 13/875,193, filed on May 1, 2013, now Pat. No. 9,163,583.

(51) Int. Cl.
| | |
|---|---|
| *F02C 1/00* | (2006.01) |
| *F02K 1/70* | (2006.01) |
| *F02K 1/76* | (2006.01) |
| *B64D 33/04* | (2006.01) |

(52) U.S. Cl.
CPC .............. *F02K 1/70* (2013.01); *B64D 33/04* (2013.01); *F02K 1/763* (2013.01); *Y02T 50/671* (2013.01)

(58) Field of Classification Search
CPC ...................................... F02K 1/70; F02K 1/72
See application file for complete search history.

(56) References Cited

U.S. PATENT DOCUMENTS

| | | | |
|---|---|---|---|
| 3,032,981 A | 5/1962 | Lawler | |
| 3,500,644 A | 3/1970 | Hom et al. | |
| 3,500,646 A | 3/1970 | Hom et al. | |
| 3,829,020 A | 8/1974 | Stearns | |
| 4,353,516 A | 10/1982 | Soligny et al. | |
| 5,039,171 A * | 8/1991 | Lore | F02K 1/70 239/265.29 |
| 5,040,730 A * | 8/1991 | Hogie | F02K 1/70 239/265.23 |
| 5,765,362 A * | 6/1998 | Gonidec | F02K 1/68 239/265.29 |
| 5,893,265 A * | 4/1999 | Gonidec | F02K 1/70 239/265.33 |
| 6,065,285 A * | 5/2000 | Gonidec | F02K 1/70 239/265.29 |
| 7,484,356 B1 | 2/2009 | Lair | |
| 2004/0068978 A1 | 4/2004 | Lair et al. | |

OTHER PUBLICATIONS

Non Final Office Action dated Sep. 18, 2014, U.S. Appl. No. 13/875,193.
Final Office Action dated Feb. 20, 2015, U.S. Appl. No. 13/875,193.
Notice of Allowance dated Jun. 24, 2015, U.S. Appl. No. 13/875,193.

* cited by examiner

*Primary Examiner* — Gerald L Sung
(74) *Attorney, Agent, or Firm* — Snell & Wilmer L.L.P.

(57) ABSTRACT

In various embodiments, the thrust vectoring systems described herein create variable reverse thrust during a landing event. The reverse thrust may be varied based on manual inputs, dynamically changing operating events, or a landing duty cycle. In various embodiments, the thrust vectoring systems comprise a movable shelf that is capable of adjusting a directing a fluid flow to create a variable reverse thrust which may reduce the risk of foreign object ingestion in the engine at lower ground speeds.

20 Claims, 5 Drawing Sheets

SYSTEM, APPARATUS, AND METHOD FOR THRUST VECTORING

CROSS-REFERENCE TO RELATED APPLICATIONS

This application is a continuation of U.S. patent application Ser. No. 13/875,193 entitled "System, Apparatus, and Method for Thrust Vectoring" and filed on May 1, 2013 which is incorporated herein by reference in its entirety.

FIELD

The present disclosure relates to thrust reverser air management, and more particularly, to creating thrust vectors with air flow in a fan air duct.

BACKGROUND

Jet powered aircraft employ thrust reversers to reduce speed during aircraft landing. Thrust reversers generally exhaust fan air in the forward direction to create reverse thrust. Thrust reversers typically employ cascades to direct the exhausted fan air.

SUMMARY

In various embodiments, a thrust reverser system may be capable of directing airflow in a fan air duct. The thrust reverser system may comprise a movable shelf, a track and a bucket door. The track may be configured to carry and translate the movable shelf. The bucket door may be configured to inhibit the airflow through the fan air duct. The bucket door may also be capable of directing the airflow to interact with the movable shelf. In various embodiments, the movable shelf may be configured to create a first thrust reverse port and a second thrust reverse port through a nacelle.

In various embodiments, a nacelle may comprise a fan duct, a movable shelf, a track, a bucket door and a blade. The movable shelf may be configured to seal a portion of the fan air duct in a first position. The track may be configured to carry and shift the movable shelf from the first position to a second position. The bucket door may be configured to direct airflow to the moveable shelf in response to the moveable shelf being in a second position. The blade may be configured to direct the airflow that passes by the movable shelf In various embodiments, a method for providing thrust reverse to an aircraft comprises activating an aircraft thrust reverser system comprising a bucket door and a movable shelf carried on a track in response to a landing event. In response to the landing event, the bucket door may be moved from a first position to a second position to inhibit airflow in a fan air duct. The movable shelf may also be moved along the track from a stowed position to a first position to generate a first thrust reverse. The movable shelf may move along the track from the first position to a second position to generate a second thrust reverse in response to a first event (e.g., the airspeed of the aircraft is reduced). The movable shelf may move along the track from the second position to the third position to generate a third thrust reverse in response to a second event (e.g., the airspeed of the aircraft is further reduced).

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
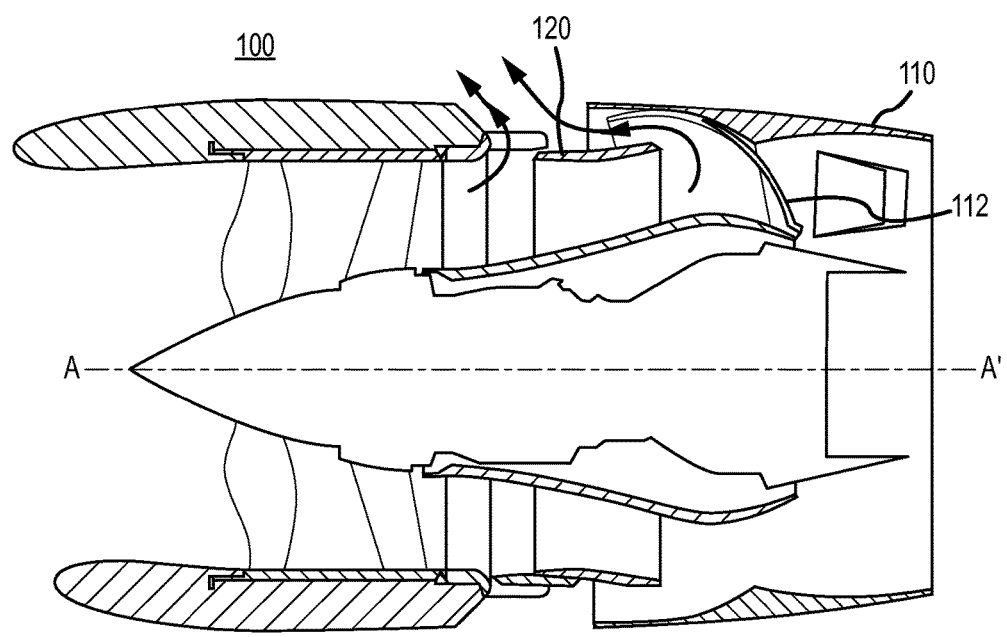
FIG. 1A illustrates a cross-sectional view of an aircraft nacelle, in accordance with various embodiments

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

In various embodiments, a thrust vectoring system, apparatus and method (collectively, the "thrust vectoring system") may be part of a larger thrust reverser system that can change the reverse thrust created by a thrust reverser system in response to thrust reverser system activation. Moreover, in various embodiments, the thrust vectoring system can increase the manufacturability of thrust reverser system components, reduce the overall weight of thrust reverser systems, and increase the reliability and/or aerodynamic efficiency of a nacelle. The thrust vectoring system can deploy to various positions during thrust reverser operation to adjust the amount and direction of reverse thrust and, as a result, the stopping power provided by the thrust reverser system may be adjusted. In this regard, the ability to vary the reverse thrust may allow the thrust reverser to have a broader operating range. For example, at higher aircraft ground speeds (e.g., at touch down), the risk of foreign object ingestion in the engine is low. Accordingly, the thrust vectoring system may be capable of operating at a high level of reverse thrust. As the aircraft ground speed is reduced, the thrust vectoring system may be adjusted, for example to reduce the amount of reverse thrust (e.g., changing the direction of the forward vector of discharge air of the thrust vectoring system), regardless of the aircraft engine RPM. This may avoid "kicking up" or "stirring up" foreign objects that could be ingested by the engine. In this way, the ability to vary and/or direct the forward vector or discharge air from the thrust reverser provides the aircraft operator with a broader thrust reverser operating range.

The thrust vectoring system can comprise a movable shelf that translates during operation to adjust the direction of air flow and associated reverse thrust (e.g., stopping power). The shelf may move or translate based on dynamically changing parameters (e.g., aircraft speed during a landing event, the amount a braking force applied by the aircraft brakes, or requested by a user), based on a predetermined duty cycle, and/or may be manually controlled by an operator (e.g., an aircraft pilot) or electronically controlled device.

In various embodiments, the movable shelf may also tend to increase manufacturing and/or production efficiency. For example, the movable shelf may have generally uniform surfaces that may be suitably formed by molding, forging, and/or simple machining. More specifically, the movable shelf may be capable of replacing a traditional cascade in a thrust reverser system. The movable shelf may be disposed in any suitable position.

Figure 1B:
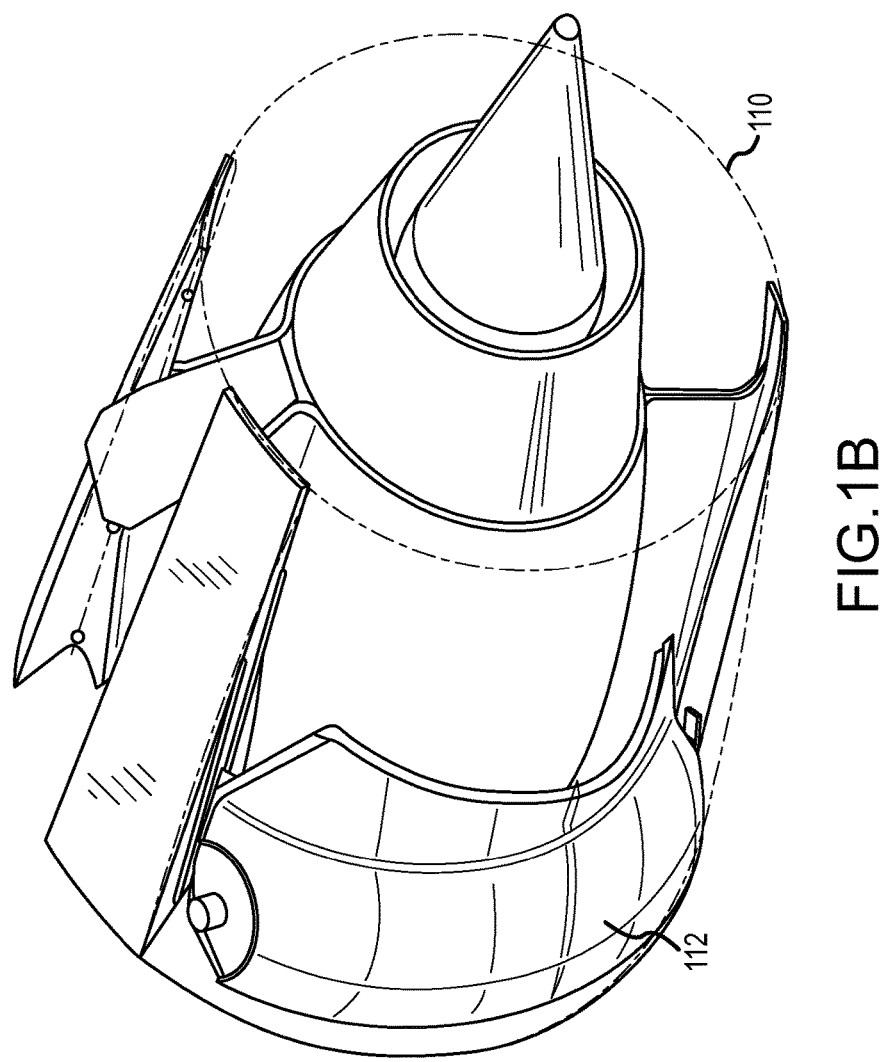
FIG. 1B illustrates a perspective view of a portion of an aircraft nacelle in a cruise configuration, in accordance with various embodiments.
Figure 1C:
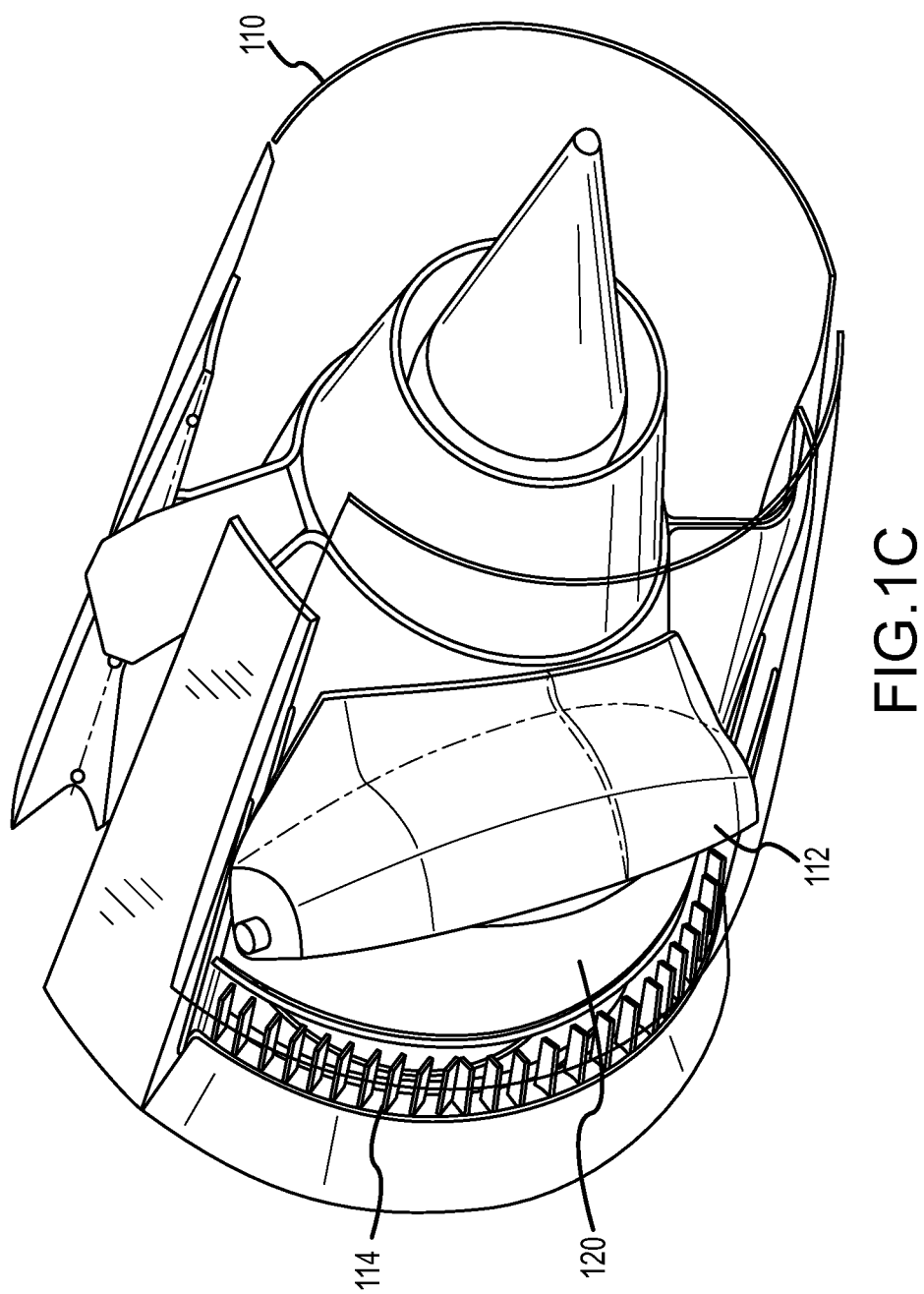
FIG. 1C illustrates a perspective view of a portion of an aircraft nacelle in a reverse thrust configuration, in accordance with various embodiments.

In various embodiments and with reference to FIGS. 1A-1C, a nacelle 100 may comprise a translating sleeve 110 and a movable shelf 120. During thrust reverser operation, a movable shelf 120 may deploy in response to a translating sleeve 110 deploying aft (e.g., in response to thrust reverser activation). FIG. 1 illustrates translating sleeve 110 in a deployed position. Movable shelf 120 may move directly aft or parallel to the centerline of the nacelle (e.g., parallel to centerline A-A'). Movable shelf 120 may also move radially inward (e.g., toward the centerline A-A' of the nacelle) in a generally perpendicular manner to the centerline. This movement creates flow channels on each of the forward and aft side of movable shelf 120. The flow channels may allow fluid flow out the side of nacelle 100 in the space created by the separation (e.g., aft movement) of translating sleeve 110. Nacelle 100 may also comprise a suitable fluid blocking system. For example, the nacelle 100 may be equipped with conventional blocker doors. Nacelle 100 may also comprise a bucket door 112 (shown in the stowed or cruise position in FIG. 1B and shown in the deployed or thrust reverse position in FIG. 1C). In response to translating sleeve 110 moving aft, the bucket door 112 may translate into the fan duct to direct fluid flow toward movable shelf 120, as shown in FIGS. 1A and 1C.

In various embodiments, bucket door 112 may have a generally curved profile to encourage or direct airflow. Bucket door 112 may be a single piece or an assembly. Bucket door 112 may be rotatably installed in the nacelle (e.g., installed on hinges). In this regard, bucket door 112 may be capable of rotating from a stowed or cruise position, as shown in FIG. 1B to a thrust revere position, as shown in FIG. 1C. The rotation may occur in response to a user input (e.g., a pilot activating a thrust reverser system), a predetermined event (e.g., a landing event), or a dynamically determined event (e.g., a detected aircraft speed).

In various embodiments, movable shelf 120 may be any suitable size and shape. Movable shelf 120 may also comprise aerodynamic features to direct fluid flow. For example, in lieu of flow control vanes, a portion of movable shelf 120 may have deflector surfaces or curves to direct fluid flow in a particular direction, or split fluid flow in multiple directions. An edge of movable shelf 120 may have a chamfer, fillet, round, radius, and/or other suitable flow directing structure. In various embodiments, movable shelf 120 may be capable of directing air through blades 114 to control the direction of the discharge air (e.g., the air that creates the revere thrust). In this regard, discharge flows in thrust reverser systems may be directed by blades 114 so the discharge flow does not impinge on various aircraft control surfaces (e.g., the flow may be directed away from various aircraft control surfaces efflux flow patterns) based on the interactions with blades 114, so that the flow does not impinge on various surfaces of an aircraft.

In various embodiments and with reference to FIGS. 2A-2D, the thrust vectoring system may comprise movable shelf 220 and a track 222. Movable shelf 220 may be operatively coupled to or mounted on track 222. Track 222 may be mounted on a portion of the nacelle such as, for example, the non-movable portion of the nacelle (e.g., in an area of the nacelle forward of translating sleeve 210). Track 222 may be any suitable structure configured to support and translate or otherwise move movable shelf 220. For example, track 222 may comprise an actuator and a path that translate movable shelf 220 to a position to direct fluid flow.

Figure 2A:
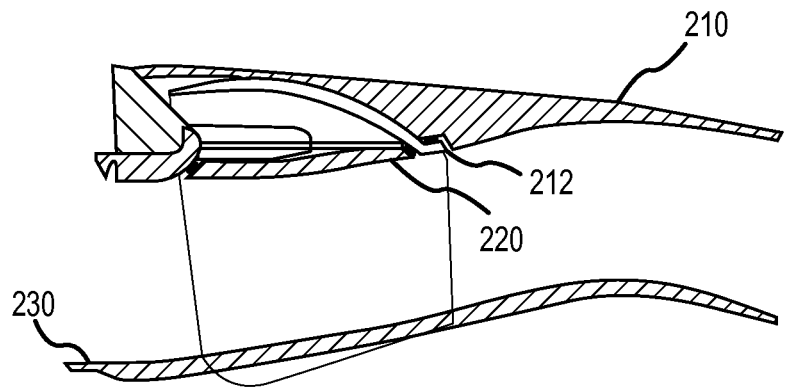
FIG. 2A illustrates a side view of a portion of an aircraft nacelle in a stowed condition, in accordance with various embodiments.

In various embodiments, movable shelf 220 may seal and/or close against a portion of a nacelle in a stowed position, as shown in FIG. 2A. For example, movable shelf 220 may form a portion of a fan duct 230. More specifically, movable shelf 220 may define a portion of the flow channel defined by fan duct 230, when movable shelf 220 is in the stowed configuration.

In various embodiments, and in response to the thrust reverser being activated, translating sleeve 210 may move aft, separating from the nacelle and opening a fluid flow path (e.g., a space) in the side of the nacelle. Track 222 may translate movable shelf 220 to a position to direct fluid flow. For example, track 222 may translate movable shelf 220 into the flow stream through fan duct 230 (e.g., flow axially in the duct and/or the flow created by the blocking structure such as, for example, a conventional blocker door or bucket door 202B and guillotine door 212).

During operation, movable shelf 220 may be translating to various positions to vary the magnitude of the reverse thrust creating by the thrust reverser. This variation in reverse thrust may be controlled manually, based on dynamically measured parameters, and/or based on a predetermined duty cycle.

Figure 2B:
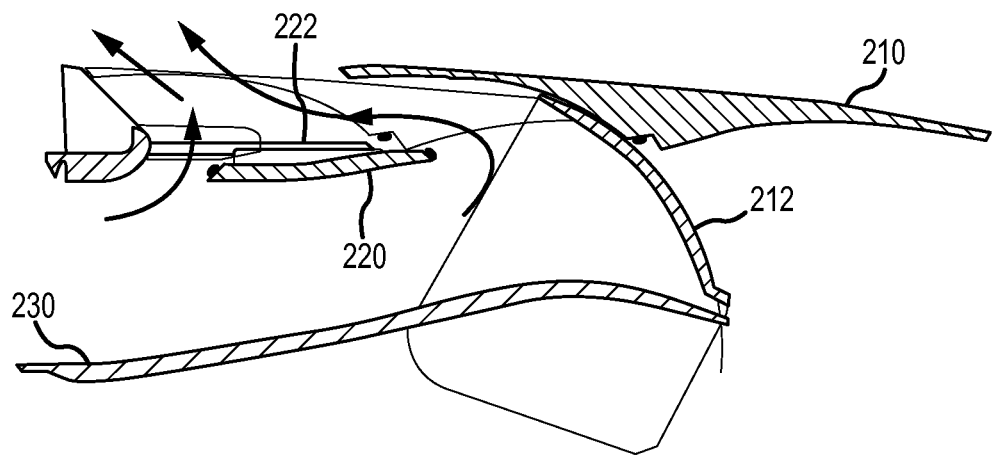
FIG. 2B illustrates a side view of a portion of an aircraft nacelle in a first thrust reverse condition, in accordance with various embodiments.

In response to a landing event (e.g., the approach and/or touchdown of an aircraft), the thrust reverser system may be activated. Just after landing the aircraft has a maximum ground speed and is typically benefited by more stopping force (e.g., more reverse thrust is desirable to reduce the speed of the aircraft). During the initial landing phase (e.g., on approach, at touch down, or in response to touch down), movable shelf 220 may be translated to a position associated with a maximum reverse thrust, allowing the fluid flow around the aft surface or edge of movable shelf 220, as shown in FIG. 2B, which may be at any suitable point along track 222 depending upon the various desired operating parameters for reverse thrust and other factors of aircraft operation, for example such as those discussed herein. This position may provide a first flow area associated with the forward edge of movable shelf 220 and a second flow area associated with the aft edge of movable shelf 220.

In various embodiments, the ability to vary flow to create reverse thrust with movable shelf 220 may also be balanced with other parameters, such as, area match (e.g., the flow area through the exhaust of the fan air duct during cruise being substantially equal to the flow area of the fan air duct and first and second ports during thrust reverser operation), pilot input to the engine (e.g., increasing or decreasing engine RPM and resulting fan air duct flow during landing), and other operating events, such as, for example, aborted landings, rejected take-offs, or similar events. In this regard, the thrust reverse may be balanced to achieve a suitable reverse thrust, while achieving, for example, an area match for the engine.

Figure 2C:
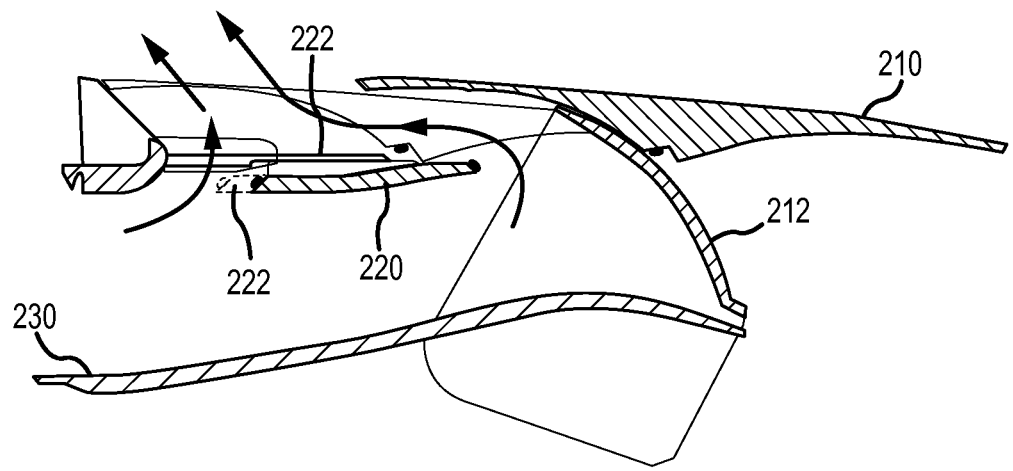
FIG. 2C illustrates a side view of a portion of an aircraft nacelle in a second thrust reverse condition, in accordance with various embodiments.
Figure 2D:
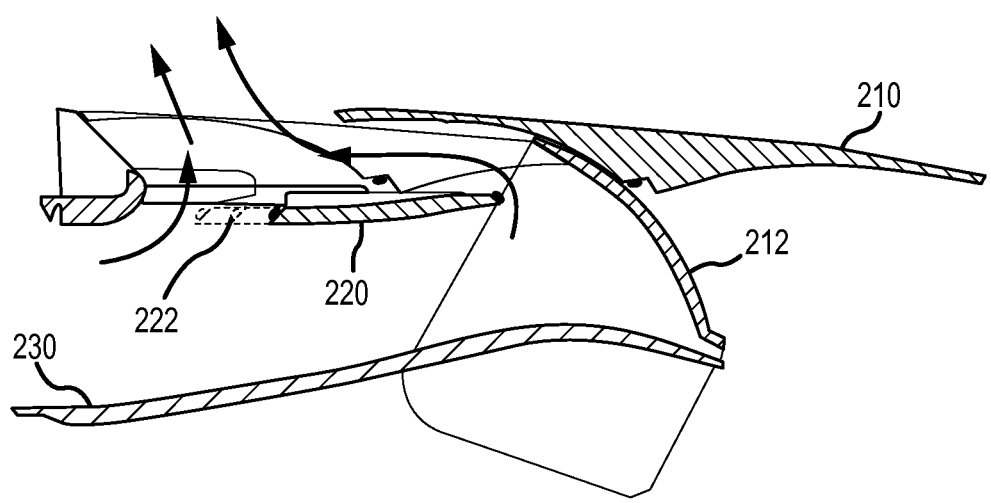
FIG. 2D illustrates a side view of a portion of an aircraft nacelle in a third thrust reverse condition, in accordance with various embodiments.

As the ground speed of the aircraft is reduced, movable shelf 220 may translate aft to a suitable position (e.g., a midpoint) in the flow stream created by blocked fan duct 230, as shown in FIG. 2C. This position may adjust a first flow area associated with the forward edge of movable shelf 220 and adjust a second flow area associated with the aft edge of movable shelf 220. This configuration may allow a generally balanced airflow around the forward edge of movable shelf 220 and aft edge of movable shelf 220. The resulting reverse thrust would be reduced relative to the initial reverse thrust. As the ground speed of the aircraft is reduced further, movable shelf 220 may translate further aft to an aft-point in the flow stream created by blocked fan duct 230, as shown in FIG. 2D. This position may adjust a first flow area associated with the forward edge of movable shelf 220 and adjust a second flow area associated with the aft edge of movable shelf 220. This configuration may allow an increased airflow around the forward edge of movable shelf 220 and a reduced airflow around the aft edge of movable shelf 220. As a result, the resulting revere thrust would be further reduced.

During operation of the thrust reverser, the position and/or movement of movable shelf 220 may be continuous and/or stepped and/or based on a predetermined operating profile. Moreover, the position or movement may be affected by other factors. For example, the amount of reverse thrust may be reduced in response to a decrease in engine RPM (e.g., the pilot reduces the engine RPM). These other factors may cause the movable shelf to move to a position that is not associated with the predetermined profile.

In various embodiments, airflow around the forward or leading edge of movable shelf 220 generally creates a radially outward (e.g., radially away from the centerline of the nacelle) airflow and resulting force. Airflow around the aft or trailing edge of movable shelf 220 generally creates a substantially forward airflow and resulting force. In this manner, airflow around the aft or trailing edge of movable shelf 220 may primarily provide reverse thrust to reduce the speed of an aircraft, while airflow around the forward or leading edge of movable shelf 220 may control (e.g., direct discharge air) and/or not materially contribute to reverse thrust. However, this flow may assist in maintaining an area match throughout thrust reverse, to maintain engine and fan RPM constants. As such, the movable shelf provide an aircraft with a variable thrust reverser system that can adapt reverse thrust to aircraft operating conditions or manual inputs from a user (e.g., a pilot).

In various embodiments, the thrust vectoring systems described herein may be employed with any suitable nacelle, engine, and/or thrust reverser system.

Thus, in various embodiments, the thrust vectoring systems described herein may provide variable reverse thrust, manufacturing efficiency, and improved the aerodynamic efficiency of a fan air duct.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A thrust reverser system, comprising:
a translating sleeve configured to expose a flow path in response to the thrust reverser system being activated;
a movable shelf comprising a body having a length in a longitudinal direction, the body disposed between a forward edge and an aft edge, wherein the body is configured to divert a flow through the flow path to the forward edge and the aft edge, wherein the forward edge at least partially defines a first reverse port located forward of the movable shelf, and wherein the aft edge at least partially defines a second reverse port located aft of the movable shelf and forward of the translating sleeve; and a track configured to position the body in a transverse orientation relative to the flow path and carry and translate the movable shelf directly aft and parallel to a centerline of a nacelle.

2. The thrust reverser system of claim 1, wherein the movable shelf is configured to create the first reverse port and the second reverse port through the nacelle.

3. The thrust reverser system of claim 2, wherein the first reverse port has a first flow area in response to a first condition.

4. The thrust reverser system of claim 3, wherein the first reverse port has a second flow area in response to a second condition.

5. The thrust reverser system of claim 3, wherein the first condition is a touch down condition.

6. The thrust reverser system of claim 4, wherein the second condition is a maximum thrust reverse condition.

7. The thrust reverser system of claim 1, wherein the movable shelf is capable of closing a portion of the nacelle in a stowed condition.

8. The thrust reverser system of claim 1, wherein the track is capable of translating the movable shelf to a first position, a second position, and a third position.

9. A nacelle, comprising:

a fan air duct;

a translating sleeve configured to translate aft from a stowed position to a deployed position to define a flow path for a thrust reverser;

a movable shelf comprising a body having a length in a longitudinal direction, the body disposed between a forward edge and an aft edge, wherein the body is configured to divert a flow through the flow path to the forward edge and the aft edge, wherein the forward edge at least partially defines a first reverse port located forward of the movable shelf, and wherein the aft edge at least partially defines a second reverse port located aft of the movable shelf and forward of the translating sleeve, wherein the movable shelf is configured to seal a portion of the fan air duct in a first position; and a track configured to position the movable shelf transverse to the flow path and carry and shift the movable shelf directly aft and parallel to a centerline of the nacelle, from the first position to a second position.

10. The nacelle of claim 9, further comprising a bucket door configured to inhibit airflow between an inlet of the fan air duct and an outlet of the fan air duct.

11. The nacelle of claim 9, wherein the first reverse port has a first flow area in response to a first condition, wherein the first condition is a landing event.

12. The nacelle of claim 9, wherein the track is further configured to shift the movable shelf to at least one of a third position or a fourth position.

13. The nacelle of claim 9, wherein the second position creates a first amount of thrust reverse.

14. The nacelle of claim 12, wherein the third position creates a second amount of thrust reverse.

15. The nacelle of claim 9, further comprising a blade having a curved profile.

16. The nacelle of claim 15, wherein the blade is capable of directing air in a first direction.

17. A method for providing thrust reverse to an aircraft comprising: activating an aircraft thrust reverser system comprising a translating sleeve configured to expose a flow path in response to the thrust reverser system being activated; a movable shelf comprising a body having a length in a longitudinal direction, the body disposed between a forward edge and an aft edge, wherein the body is configured to divert a flow through the flow path to the forward edge and the aft edge, wherein the forward edge at least partially defines a first reverse port located forward of the movable shelf, and wherein the aft edge at least partially defines a second reverse port located aft of the movable shelf and forward of the translating sleeve; and a track configured to position the body in a transverse orientation relative to the flow path and carry and translate the movable shelf directly aft and parallel to a centerline of a nacelle; moving the translating sleeve to expose the flow path in response to the aircraft thrust reverser system being activated, in response to a landing event; inhibiting airflow in a fan air duct; moving the body of the movable shelf along the track from a stowed position to a first position to generate a first thrust reverse, moving the movable shelf along the track from the first position to a second position to generate a second thrust reverse in response to a first event; and moving the movable shelf along the track from the second position to a third position to generate a third thrust reverse in response to a second event.

18. The method of claim 17, wherein the activating may be automatic or a response to a manual command.

19. The method of claim 17, wherein the first event is at least one of a predetermined event and a dynamically determined event.

20. The method of claim 17, wherein the second event is at least one of a time and a measured ground speed of the aircraft during landing.

* * * * *